United States Patent
Cakmakci et al.

(10) Patent No.: US 10,162,180 B2
(45) Date of Patent: Dec. 25, 2018

(54) EFFICIENT THIN CURVED EYEPIECE FOR SEE-THROUGH HEAD WEARABLE DISPLAY

(71) Applicant: Google Inc., Mountain View, CA (US)

(72) Inventors: Ozan Cakmakci, Sunnyvale, CA (US); Oscar A. Martinez, Mountain View, CA (US); James Dunphy, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 257 days.

(21) Appl. No.: 14/730,983

(22) Filed: Jun. 4, 2015

(65) Prior Publication Data

US 2016/0357016 A1    Dec. 8, 2016

(51) Int. Cl.
*G02B 27/00* (2006.01)
*G02B 27/01* (2006.01)
*H04N 5/33* (2006.01)

(52) U.S. Cl.
CPC ........... *G02B 27/0172* (2013.01); *H04N 5/33* (2013.01); *G02B 2027/013* (2013.01); *G02B 2027/0123* (2013.01); *G02B 2027/0125* (2013.01); *G02B 2027/0138* (2013.01); *G02B 2027/0178* (2013.01); *G02B 2027/0187* (2013.01)

(58) Field of Classification Search
CPC ........ G02B 27/0172; G02B 2027/0178; G02B 27/144
USPC ........................................................ 250/349
See application file for complete search history.

(56) References Cited

U.S. PATENT DOCUMENTS

| 4,218,111 A | 8/1980 | Withrington et al. |
| 4,220,400 A | 9/1980 | Vizenor |
| 4,560,233 A | 12/1985 | Banbury |
| 4,711,512 A | 12/1987 | Upatnieks |

(Continued)

FOREIGN PATENT DOCUMENTS

| EP | 0 898 726 B1 | 3/2000 |
| EP | 0 995 145 B1 | 9/2001 |

(Continued)

OTHER PUBLICATIONS

WO 2015044299 A1 English Translation.*

(Continued)

*Primary Examiner* — Michael C Bryant (57) ABSTRACT

An eyepiece for a head wearable display includes a curved lightguide component, an input coupler, and an output coupler. The curved lightguide component guides display light received at an input region peripherally located from a viewing region and emits the display light along an eye-ward direction in the viewing region. The curved lightguide component includes an eye-ward facing surface that is concave and a world facing surface that is convex. The input coupler is disposed at the input region to couple the display light into the curved lightguide component. The output coupler is disposed at the viewing region to redirect the display light towards the eye-ward direction for output from the curved lightguide component. The output coupler is partially transmissive to ambient light incident through the world facing surface. The display light is guided between the input coupler and the output coupler entirely by total internal reflection.

18 Claims, 8 Drawing Sheets

(56) References Cited

U.S. PATENT DOCUMENTS

| | | |
|---|---|---|
| 4,799,765 A | 1/1989 | Ferrer |
| 4,968,117 A | 11/1990 | Chern et al. |
| 5,050,966 A | 9/1991 | Berman |
| 5,076,664 A | 12/1991 | Migozzi |
| 5,093,567 A | 3/1992 | Staveley |
| 5,237,455 A | 8/1993 | Bordo et al. |
| 5,257,133 A | 10/1993 | Chen |
| 5,537,253 A | 7/1996 | Cox et al. |
| 5,539,422 A | 7/1996 | Heacock et al. |
| 5,654,827 A | 8/1997 | Reichert |
| 5,694,230 A | 12/1997 | Welch |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,821,911 A | 10/1998 | Jachimowicz |
| 5,844,530 A | 12/1998 | Tosaki |
| 5,880,888 A | 3/1999 | Schoenmakers et al. |
| 5,886,822 A | 3/1999 | Spitzer |
| 5,896,232 A | 4/1999 | Budd et al. |
| 5,923,476 A | 7/1999 | Heffner |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,023,372 A | 2/2000 | Spitzer et al. |
| 6,057,966 A | 5/2000 | Carroll et al. |
| 6,091,546 A | 7/2000 | Spitzer |
| 6,094,241 A | 7/2000 | Yamazaki |
| 6,111,701 A | 8/2000 | Brown |
| 6,147,807 A | 11/2000 | Droessler et al. |
| 6,172,657 B1 | 1/2001 | Kamakura et al. |
| 6,201,629 B1 | 3/2001 | McClelland et al. |
| 6,204,974 B1 | 3/2001 | Spitzer |
| 6,204,975 B1 | 3/2001 | Watters et al. |
| 6,222,677 B1 | 4/2001 | Budd et al. |
| 6,236,509 B1 | 5/2001 | Grandjean et al. |
| 6,236,511 B1 | 5/2001 | Brown |
| 6,330,118 B1 | 12/2001 | Daschner et al. |
| 6,349,001 B1 | 2/2002 | Spitzer |
| 6,349,004 B1 | 2/2002 | Fischer et al. |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,462,882 B2 | 10/2002 | Chen et al. |
| 6,466,471 B1 | 10/2002 | Bhattacharyya |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,760,169 B2 | 7/2004 | Takahashi et al. |
| 6,825,987 B2 | 11/2004 | Repetto et al. |
| 6,829,095 B2 | 12/2004 | Amitai |
| 6,847,488 B2 | 1/2005 | Travis |
| 6,879,443 B2 | 4/2005 | Spitzer et al. |
| 6,961,162 B2 | 11/2005 | Nakamura et al. |
| 7,057,814 B2 | 6/2006 | Boyd et al. |
| 7,095,562 B1 | 8/2006 | Peng et al. |
| 7,119,965 B1 | 10/2006 | Rolland et al. |
| 7,145,726 B2 | 12/2006 | Geist |
| 7,158,096 B1 | 1/2007 | Spitzer |
| 7,205,960 B2 | 4/2007 | David |
| 7,210,803 B2 | 5/2007 | Matsunaga et al. |
| 7,230,766 B2 | 6/2007 | Rogers |
| 7,242,527 B2 | 7/2007 | Spitzer et al. |
| 7,391,573 B2 | 6/2008 | Amitai |
| 7,411,637 B2 | 8/2008 | Weiss |
| 7,450,310 B2 | 11/2008 | McGuire |
| 7,457,040 B2 | 11/2008 | Amitai |
| 7,542,209 B2 | 6/2009 | McGuire, Jr. |
| 7,566,863 B2 | 7/2009 | Chang et al. |
| 7,576,916 B2 | 8/2009 | Amitai |
| 7,577,326 B2 | 8/2009 | Amitai |
| 7,586,686 B1 | 9/2009 | Hall |
| 7,595,480 B2 | 9/2009 | Kress |
| 7,595,933 B2 | 9/2009 | Tang |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,715,103 B2 | 5/2010 | Sprague et al. |
| 7,724,441 B2 | 5/2010 | Amitai |
| 7,724,442 B2 | 5/2010 | Amitai |
| 7,724,443 B2 | 5/2010 | Amitai |
| 7,821,715 B2 | 10/2010 | Suzuki et al. |
| 7,843,403 B2 | 11/2010 | Spitzer |
| 7,900,068 B2 | 3/2011 | Weststrate et al. |
| 7,944,616 B2 | 5/2011 | Mukawa et al. |
| 8,004,765 B2 | 8/2011 | Amitai |
| 8,212,859 B2 | 7/2012 | Tang et al. |
| 8,294,994 B1 | 10/2012 | Kelly |
| 8,336,333 B2 | 12/2012 | Ushigome |
| 8,384,999 B1 | 2/2013 | Crosby et al. |
| 8,411,365 B2 | 4/2013 | Saito |
| 8,471,967 B2 | 6/2013 | Miao et al. |
| 8,488,246 B2 | 7/2013 | Border et al. |
| 8,639,072 B2 | 1/2014 | Popovich et al. |
| 8,665,178 B1 | 3/2014 | Wang |
| 9,013,793 B2 | 4/2015 | Gupta et al. |
| 2002/0015116 A1 | 2/2002 | Park |
| 2002/0167733 A1 | 11/2002 | Roest |
| 2002/0186179 A1 | 12/2002 | Knowles |
| 2003/0090439 A1 | 5/2003 | Spitzer et al. |
| 2003/0107816 A1 | 6/2003 | Takagi et al. |
| 2004/0190150 A1 | 9/2004 | Nagaoka |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0215244 A1 | 9/2006 | Yosha et al. |
| 2007/0070859 A1 | 3/2007 | Hirayama |
| 2008/0219025 A1 | 9/2008 | Spitzer et al. |
| 2009/0067057 A1 | 3/2009 | Sprague et al. |
| 2009/0122414 A1 | 5/2009 | Amitai |
| 2010/0046070 A1 | 2/2010 | Mukawa |
| 2010/0046075 A1 | 2/2010 | Powell et al. |
| 2010/0079356 A1 | 4/2010 | Hoellwarth |
| 2010/0103078 A1 | 4/2010 | Mukawa et al. |
| 2010/0111472 A1* | 5/2010 | DeJong ............ G02B 27/0081 385/31 |
| 2010/0149073 A1 | 6/2010 | Chaum et al. |
| 2010/0278480 A1 | 11/2010 | Vasylyev |
| 2011/0149201 A1 | 6/2011 | Powell et al. |
| 2011/0193814 A1 | 8/2011 | Gay et al. |
| 2011/0213664 A1 | 9/2011 | Osterhout et al. |
| 2011/0221656 A1 | 9/2011 | Haddick et al. |
| 2012/0162549 A1 | 6/2012 | Gao et al. |
| 2012/0212398 A1 | 8/2012 | Border et al. |
| 2012/0212399 A1 | 8/2012 | Border et al. |
| 2012/0249797 A1 | 10/2012 | Haddick et al. |
| 2012/0293548 A1 | 11/2012 | Perez et al. |
| 2013/0033756 A1 | 2/2013 | Spitzer et al. |
| 2013/0083404 A1 | 4/2013 | Takagi et al. |
| 2013/0229712 A1 | 9/2013 | Kress |
| 2014/0063055 A1 | 3/2014 | Osterhout et al. |
| 2014/0140654 A1 | 5/2014 | Brown et al. |
| 2014/0375789 A1 | 12/2014 | Lou et al. |

FOREIGN PATENT DOCUMENTS

| | | |
|---|---|---|
| EP | 1 930 762 A1 | 6/2008 |
| EP | 1 465 003 B1 | 12/2008 |
| GB | 2 272 980 A | 6/1994 |
| JP | 2001-066543 A | 3/2001 |
| JP | 4550184 B2 | 9/2010 |
| WO | WO 96/05533 A1 | 2/1996 |
| WO | WO 2007/065995 A1 | 6/2007 |
| WO | WO 2009/153446 A2 | 12/2009 |
| WO | WO 2010/097439 A1 | 9/2010 |

(56) References Cited

FOREIGN PATENT DOCUMENTS

| WO | WO 2013/112705 A1 | 8/2013 |
|---|---|---|
| WO | WO 2013/175465 A1 | 11/2013 |
| WO | WO 2015/044299 A1 | 4/2015 |

OTHER PUBLICATIONS

PCT/US2016/031032—International Search Report and Written Opinion, dated Jul. 12, 2016, 14 pages.
Cakmakci, O. et al., "Head-Worn Displays: A Review", IEEE, Journal of Display Technology, vol. 2, No. 3, Sep. 2006, pp. 199-216.
Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.
Cakmakci, O. et al. "Design of a Freeform Single-Element Head-Worn Display", Proc. of SPIE vol. 7618, 761803, 2010, 6 pages.
Kress, B. et al., "Low Cost Replicable Plastic HUD combiner element", Photonics in the Transportation Industry: Auto to Aerospace II, Proc. SPIE vol. 7314, 73140I, Apr. 2009, 8 pages.
Kress, B. et al., "Digital combiner achieves low cost and high reliability for head-up display applications", SPIE Newsroom. DOI: 10.1117/2.1200904.1599, May 2009, 3 pages.
Kress, B. et al., "Applied Digital Optics: From Micro-optics to Nanophotonics, Chapter 5: Digital Diffractive Optics: Analytic Type", 40 pages, 2009, John Wiley & Sons, Ltd.
Kress, B. et al., "Applied Digital Optics: From Micro-optics to Nanophotonics, Chapter 12: Digital Optics Fabrication Techniques", 74 pages, 2009, John Wiley & Sons, Ltd.
Kress, B. et al., "Applied Digital Optics: From Micro-optics to Nanophotonics, Chapter 14: Replication Techniques for Digital Optics", 27 pages, 2009, John Wiley & Sons, Ltd.
Kress, B. et al., "Applied Digital Optics: From Micro-optics to Nanophotonics, Chapter 16: Digital Optics Application Pools", 60 pages, 2009, John Wiley & Sons, Ltd.
Levola, T., "Diffractive Optics for Virtual Reality Displays," Academic Dissertation, Joensuu 2005, University of Joensuu, Department of Physics, Vaisala Laboratory, 26 pages.
Kent Optronics, Liquid Crystal for Photonics, "Switchable Mirror/Switchable Glass", retrieved from Internet Dec. 16, 2013, 1 page, http://www.kentoptronics.com/switchable.html.
Kent Optronics, Inc., Liquid Crystals for Photonics, "Liquid Crystal Switchable Mirror", 2 pages, http://www.kentoptronics.com , prior to Mar. 12, 2014.
International Preliminary Report on Patentability dated Dec. 14, 2017 for PCT Application No. PCT/US2016/031032, 10 pages.

\* cited by examiner

EFFICIENT THIN CURVED EYEPIECE FOR SEE-THROUGH HEAD WEARABLE DISPLAY

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and apparatus for an eyepiece of a head wearable display that leverages total internal reflections between input and output couplers are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
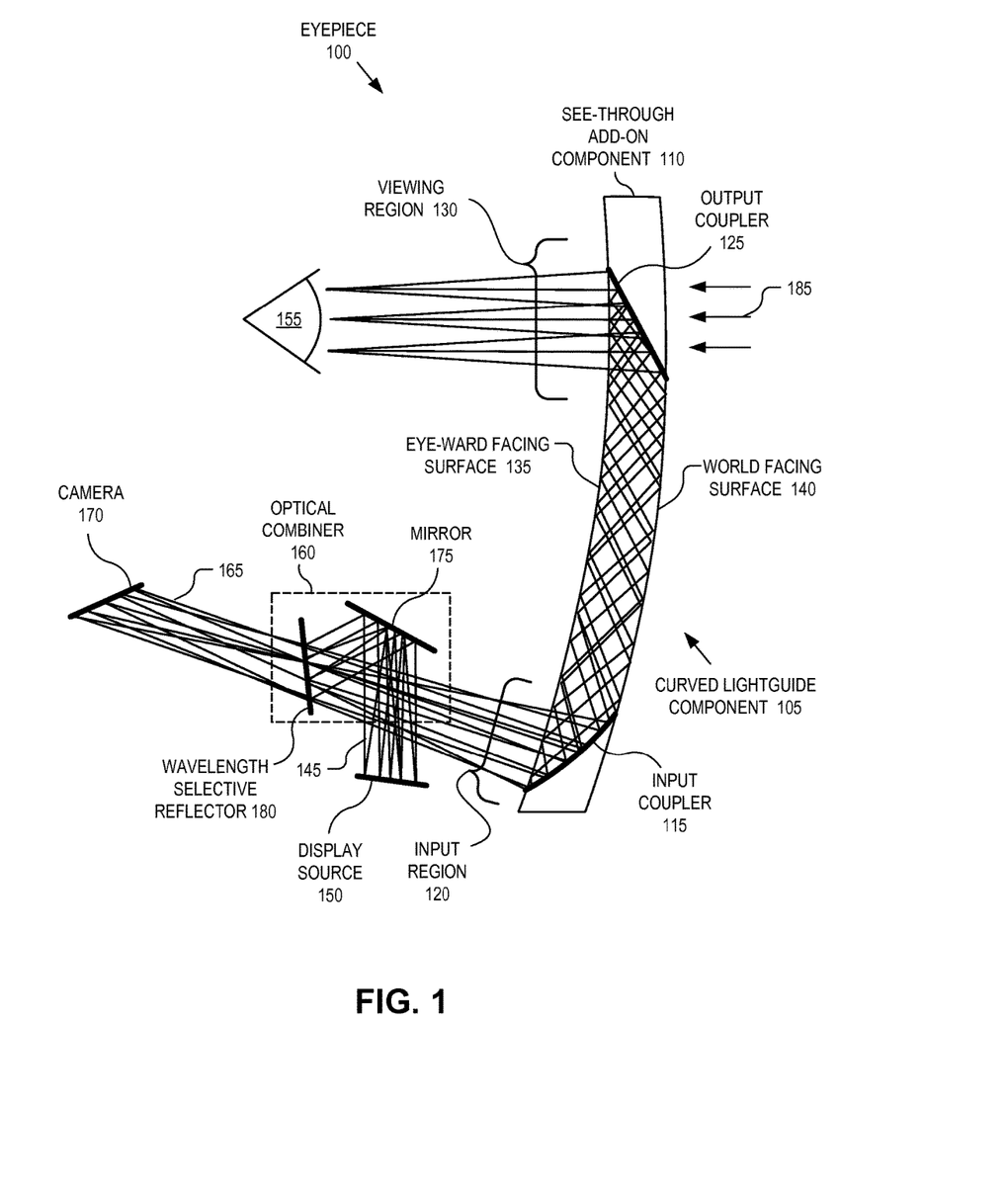
FIG. 1 illustrates an eyepiece for a head wearable display, in accordance with an embodiment of the disclosure.

FIG. 1 illustrates an eyepiece 100 for use with a head wearable display, in accordance with an embodiment of the disclosure. The illustrated embodiment of eyepiece 100 includes a curved lightguide component 105, a see-through add-on component 110, an input coupler 115 disposed at an input region 120, and an output coupler 125 disposed at a viewing region 130. The illustrated embodiment of curved lightguide component 105 includes an eye-ward facing surface 135 and a world facing surface 140.

Eyepiece 100 is well suited for use with head wearable display ("HMDs"). When integrated with an HMD, eyepiece 100 receives display light 145 generated by display source 150 at input region 120 peripherally located from viewing region 130 and emits display light 145 along an eye-ward direction in viewing region 130 toward a user's eye 155. Between input coupler 115 and output coupler 125 display light is guided entirely by total internal reflection ("TIR") between eye-ward facing surface 135 and world facing curve 140.

In the illustrated embodiment, an optical combiner 160 may be integrated with an HMD to combine display light 145 with infrared ("IR") light 165 along a common path through eyepiece 100. For example, infrared light 165 received from eyepiece 100 is directed by optical combiner to a camera 170, which may be configured to capture IR light 165 to monitor motion of eye 155. Correspondingly, optical combiner 160 directs display light 145 received from display source 150 towards eyepiece 100 for in-coupling into curved lightguide component 105 at input region 120. The illustrated embodiment of optical combiner 160 includes a mirror 175 and a wavelength selective reflector 180. Mirror 175 may be implemented as a conventional 100% reflective surface for reflecting the visible spectrum display light 145 while wavelength selective reflector 180 may be implemented as a "cold mirror," which substantially passes IR spectrum light 165 while substantially reflecting visible spectrum display light 145. In one embodiment, wavelength selective reflector 180 may be implemented using a multi-layer dichroic coating. Other optical combiner configurations may be implemented to multiplex IR light 165 and display light 145. Although not illustrated, an infrared emitter may be positioned to illuminate eye 155 with IR light 165.

In the illustrated embodiment, display light 150 is incident through eye-ward facing surface 135 at input region 120 and enters into curved lightguide component 105. Input coupler 115 is disposed at input region 120 and functions to redirect display light 145 along a trajectory within curved lightguide component 105 that causes TIR propagation down curved lightguide component 105 toward viewing region 130 and output coupler 125. In one embodiment, input coupler 115 is a mirror (e.g. silver coating or other reflective coating) having a freeform surface. Display light 145 is guided entirely via TIR from input coupler 115 to output coupler 125 where display light 145 is redirected out curved light guide component 105 via a final reflection off output coupler 125 at viewing region 130.

Output coupler 125 is a partial reflector or beam splitter (e.g., thin silver coating) having a freeform surface. In one embodiment, output coupler 125 is more transmissive to visible light than it is reflective. For example, output coupler 125 may be implemented as 15% reflective and 85% transmissive. Of course, other reflective/transmissive ratios may be implemented. Accordingly, viewing region 130 is partially transmissive to ambient light 185 incident through world facing surface 140 such that viewing region 130 is see-through. See-through add-on component 110 is disposed across viewing region 130 to provide a complementary curvature along world facing surface 140 to offset the optical power of the curvature of eye-ward facing surface 135 encountered by ambient light 185. In one embodiment, see-through add-on component 110 and curved lightguide component 105 are fabricated of the same transparent materials or transparent materials having substantially the same index of refraction. Thus, eyepiece 100 operates as an optical combiner, which combines ambient light 185 with display light 145 emitted out viewing region 130 along an eye-ward direction into eye 155. In this way, eyepiece 100 is capable of displaying an augmented reality to eye 155.

In the illustrated embodiment, see-through add-on component 110 is bonded to curved lightguide component 105 along an interface having output coupler 125 disposed there between. As mentioned above, world facing surface 140 and eye-ward facing surface 135 have complementary curvatures that substantially offset each other's optical power to ambient light 185 passing through. In other words, the input angle of ambient scene light entering world facing surface 140 is substantially equivalent to the output angle of ambient scene light exiting eye-ward facing surface 135. As such, eyepiece 100 passes at least a portion of ambient light 185 through viewing region 130 substantially without lensing, thereby permitting the user to have a substantially undistorted view of the ambient environment in front of eyepiece 100. In other embodiments, world facing surface 140 and eye-ward facing surface 135 are surfaces with non-complementary curvatures that collectively provide corrective lensing power to passing ambient light. Furthermore, by matching the refractive index of curved lightguide component 105 and see-through add-on component 110, there is no optical power at the curved interface of output coupler 125 for ambient light 185 passing through. However, the curvature of output coupler 125 does apply reflective lensing power to the internal display light 145.

Eyepiece 100 can be implemented as a thin, curved eyepiece having a thickness less than 4 mm. In one embodiment, curved lightguide component 105 has a thickness of about 3.5 mm when fabricated of a transparent material (e.g., OKP4HT-L, EP5000, polycarbonate, etc.) having an index of refraction of 1.64. The higher the refractive index the thinner the eyepiece. The curvatures of both eye-ward facing surface 135 and world facing surface 140 may be implemented as spherical surfaces. Collectively, the curvature and slim nature of eyepiece 100 provide a desirable industrial design. Eyepiece 100 not only has desirable industrial design, but is also efficient since the only lossy bounce for display light 145 traveling from input region 120 to viewing region 130 is the single redirection by output coupler 125. This permits output coupler 125 to be substantially more transmissive than reflective thereby improving the see-through characteristic of eyepiece 100 in viewing region 130.

In one embodiment, spherical curvatures for eye-ward facing surface 135 and world facing surface 140 along with freeform surfaces for input coupler 115 and output coupler 125 generate an implementation of eyepiece 100 that provides 15 degree field of view ("FOV") and a 4.6 mm diameter unvignetted pupil when curved light guide component 105 is fabricated of a transparent material having a refractive index of 1.64. In this example embodiment, eye-ward facing surface 135 and world facing surface 140 having spherical radii of 90 mm and 93.5 mm, respectively. In this example, the freeform surfaces of input coupler 115 and output coupler 125 are defined by the following equations:

$$z = \frac{cr^2}{1 + \sqrt{1 - (1+k)c^2r^2}} + \sum_{j=2}^{66} C_j x^m y^n, \quad \text{(Equation 1)}$$

$$j = \frac{(m+n)^2 + m + 3n}{2} + 1. \quad \text{(Equation 2)}$$

In one embodiment, input coupler 115 has a freeform shape defined by equations 1 and 2 with coefficient values of $x^2 = -3.0598\text{E-}03$, $y^2 = 4.6107\text{E-}04$, $x^3 = 3.3378\text{E-}05$, $x^2 y = 4.8220\text{E-}06$, $(x,y,z) = (-28.5, 0, -3)$, and a relative tilt of 48.8 degrees. In one embodiment, output coupler 125 has a freeform shape defined by equations 1 and 2 with coefficient values of $x^2 = 4.6482\text{E-}03$, $y^2 = 5.6526\text{E-}03$, and a relative tilt of 26 degrees. Of course, other coefficient terms and/or values and dimensions may be implemented.

Eyepiece 100 may be combined with various other eyewear features. For example, world facing surface 140 may have a non-complementary curvature to eye-ward facing surface 135 to introduce prescriptive lensing to ambient light. In yet other embodiments, photochromic and/or electrochromic coatings may be applied to world facing surface 140 to provide a bright light shading feature (e.g., sunglasses).

Figure 2:
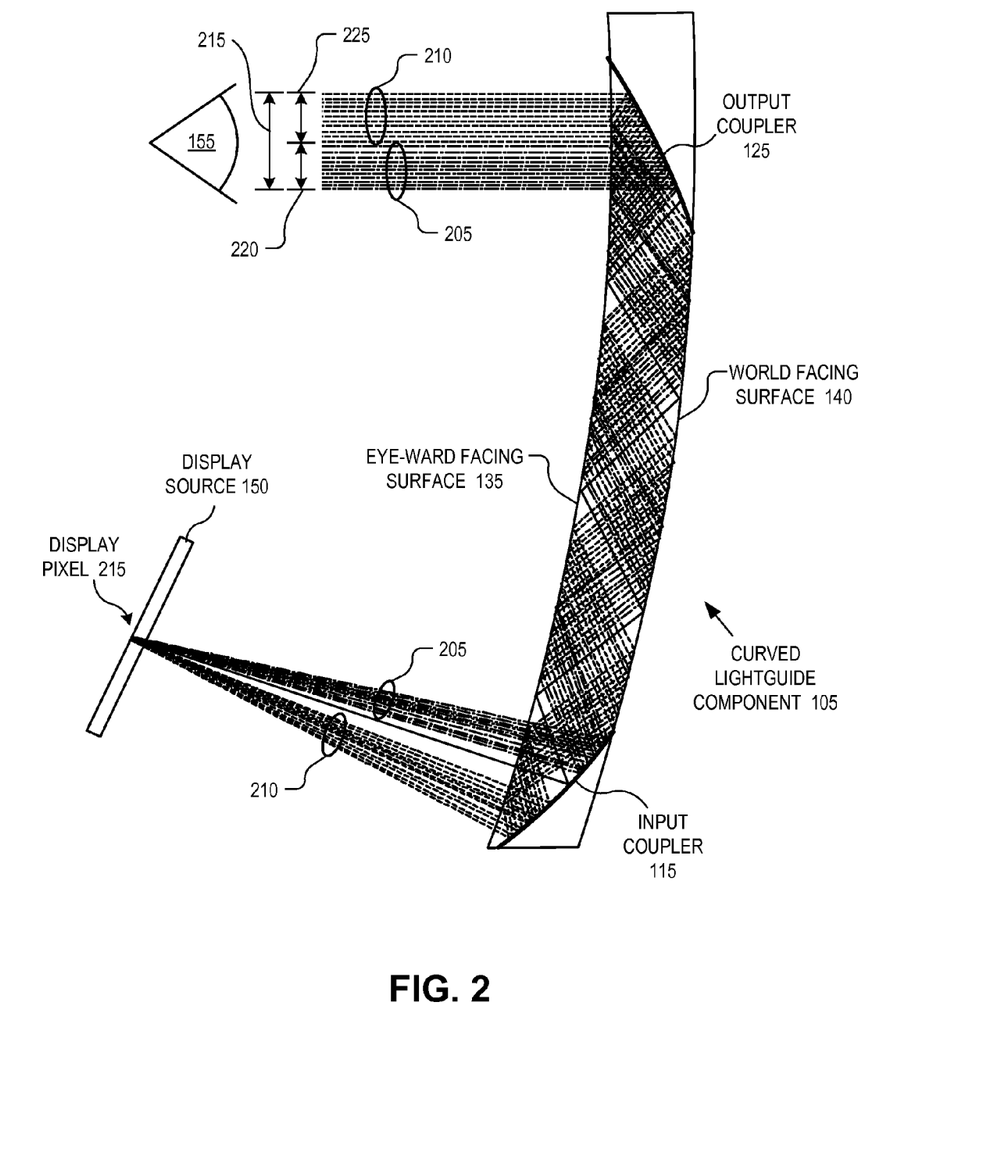
FIG. 2 illustrates how the eyepiece stitches together ray bundles output from a single display pixel to extend the eyebox of the eyepiece, in accordance with an embodiment of the disclosure.

FIG. 2 illustrates how eyepiece 100 stitches ray bundles output from a single display pixel to extend an eyebox of eyepiece 100, in accordance with an embodiment of the disclosure. Ray bundles 205 and 210 output from a single display pixel 215 are stitched together in the viewing region to extend eyebox 220 from which eye 155 can perceive display pixel 215. This stitching is achieved by leveraging the different paths followed by ray bundles 205 and 210. In fact, ray bundle 205 follows a path through curved lightguide component 105 having a different number of TIR reflections/bounces than ray bundle 210. For example, in the illustrated embodiment, ray bundle 205 encounters seven total reflections (including five TIR reflections off of eye-ward and world facing surfaces 135, 140) while ray bundle 210 encounters nine total reflections (including seven TIR reflections off of eye-ward and world facing surfaces 135, 140).

Ray bundle 205 provides a sub-eyebox 220 from which eye 155 can perceive display pixel 215 while ray bundle 210 provides another sub-eyebox 225 from which eye 155 can perceive display pixel 215. The sub-eyeboxes 220 and 225 are seamlessly stitched together to form an extended eyebox 215. This stitching of ray bundles 205 and 210 to extend eyebox 220 is achieved by configuring the curvatures of input coupler 115, output coupler 125, eye-ward facing surface 135, and world facing surface 140.

Conventionally, ray bundles from a single display pixel that encounter a different number of reflections within a lightguide of an eyepiece would result in a deleterious ghost image that is disjoint from the primary image. As such, conventional optical designers strive to prevent, block, or otherwise dispose of the ghost image before it reaches eye 155. However, the design of eyepiece 100 seeks to leverage these dual path reflections by seamlessly stitching them together at the output of eyepeice 100 to form a larger, extended eyebox 215.

Figure 3A:
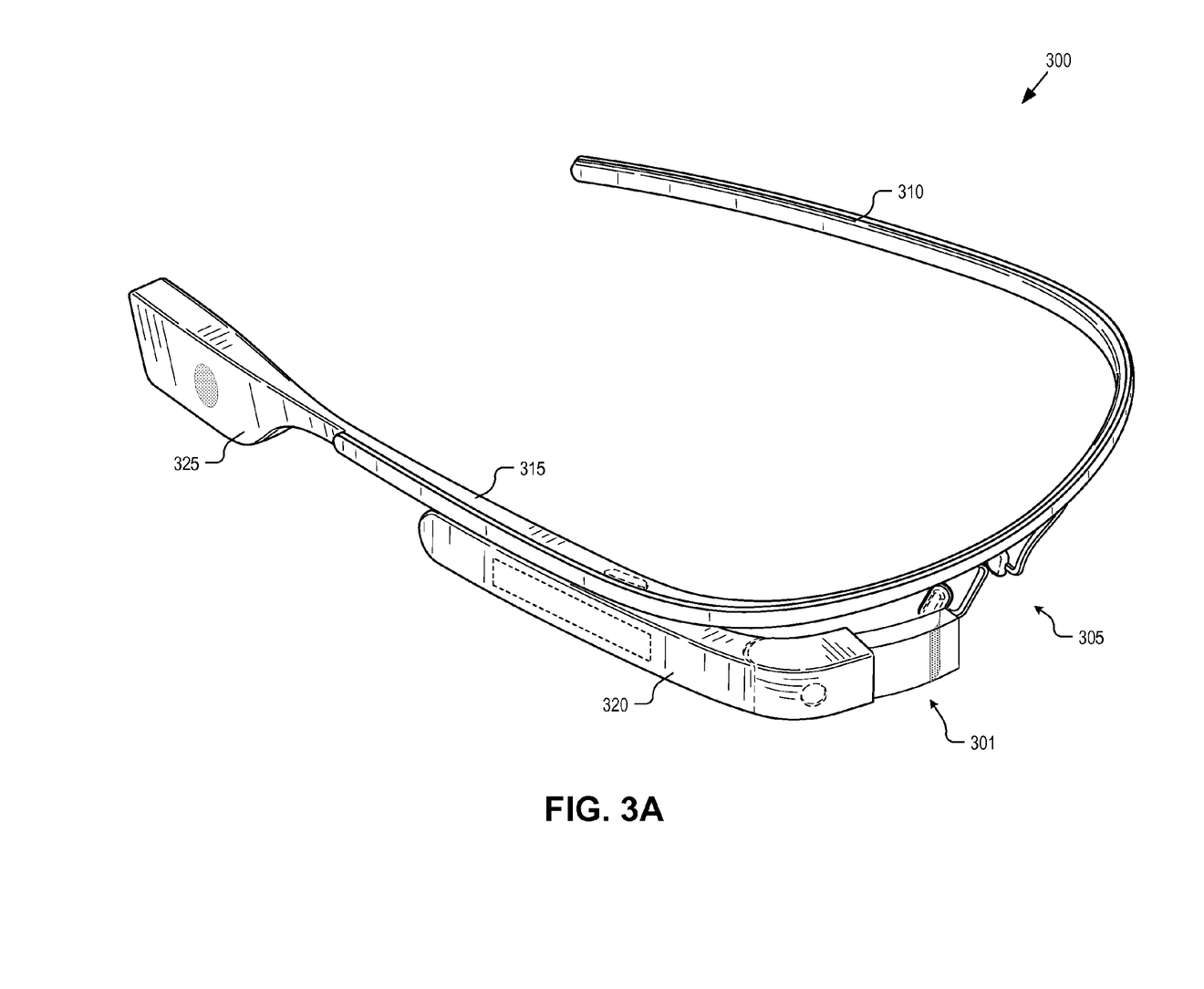
FIGS. 3A and 3B illustrate a demonstrative monocular head wearable display including a see-through eyepiece, in accordance with an embodiment of the disclosure.
Figure 3B:
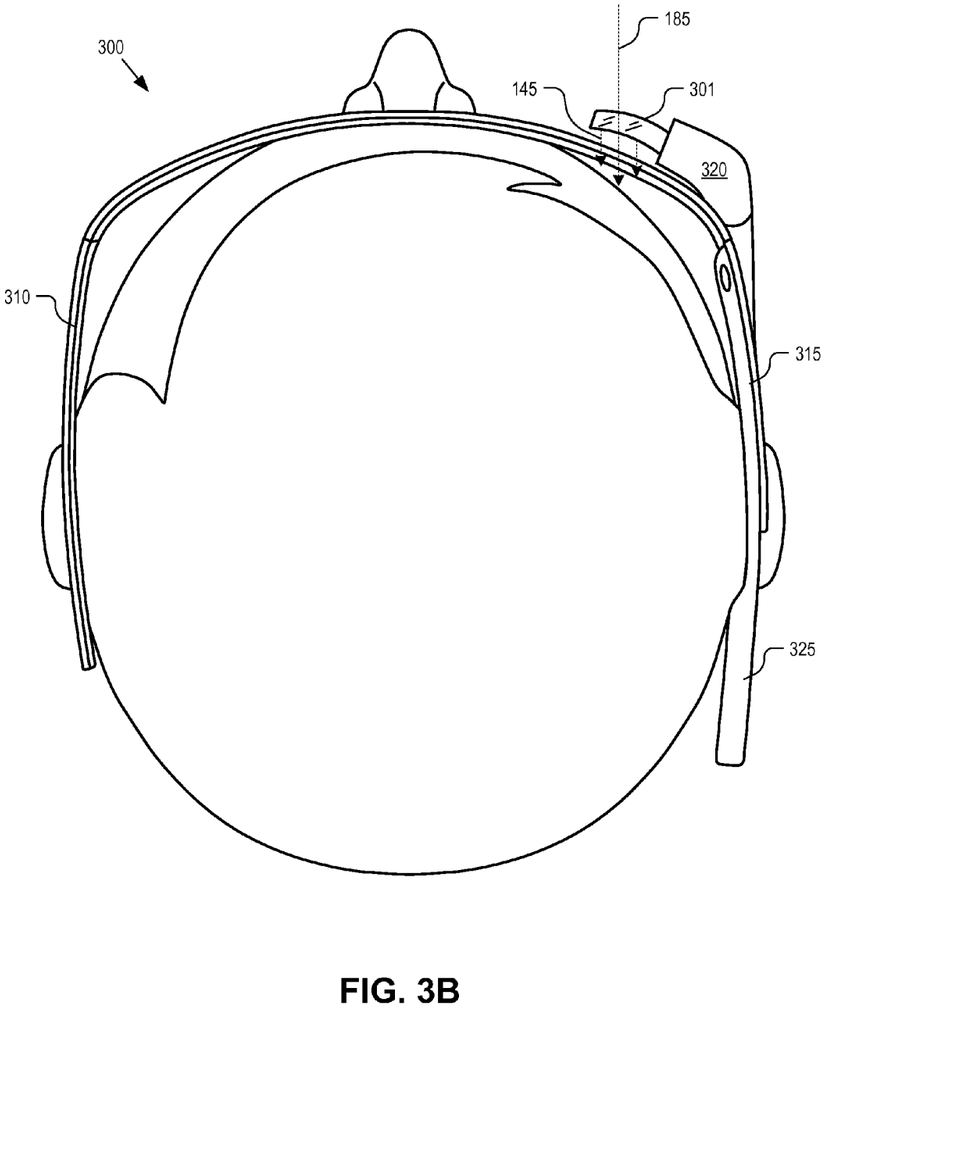

FIGS. 3A and 3B illustrate a monocular head wearable display 300 using an eyepiece 301, in accordance with an embodiment of the disclosure. FIG. 3A is a perspective view of head wearable display 300, while FIG. 3B is a top view of the same. Eyepiece 301 may be implemented with embodiments of eyepiece 100 as discussed above, or any of the other eyepiece embodiments described below (or combinations thereof). Eyepiece 301 is mounted to a frame assembly, which includes a nose bridge 305, left ear arm 310, and right ear arm 315. Housings 320 and 225 may contain various electronics including a microprocessor, interfaces, one or more wireless transceivers, a battery, a camera, a speaker, a display source, etc. Although FIGS. 3A and 3B illustrate a monocular embodiment, head wearable display 300 may also be implemented as a binocular display with two eyepieces 301 each aligned with a respective eye of the user when display 300 is worn.

The see-through eyepiece 301 is secured into an eye glass arrangement so head wearable display can be worn on the head of a user. The left and right ear arms 310 and 315 rest over the user's ears while nose bridge 305 rests over the user's nose. The frame assembly is shaped and sized to position viewing region 130 in front of an eye of the user. Other frame assemblies having other shapes may be used (e.g., traditional eyeglasses frame, a single contiguous headset member, a headband, goggles type eyewear, etc.).

Figure 4:
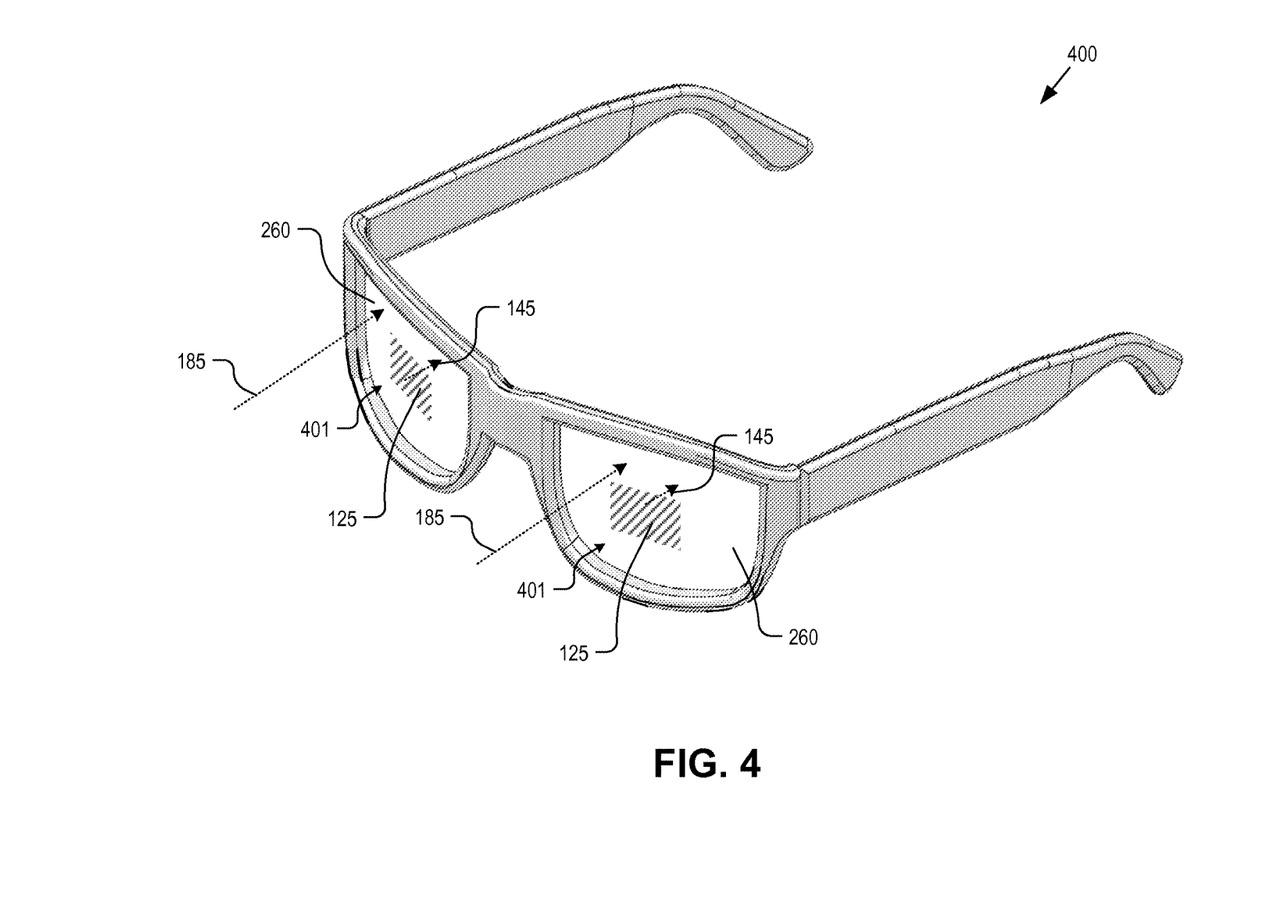
FIG. 4 illustrates a demonstrative binocular head wearable display including see-through eyepieces, in accordance with an embodiment of the disclosure.

As mentioned, FIGS. 3A and 3B illustrate a monocular embodiment with a compact see-through eyepiece that only covers a portion of the user's field of view. In other embodiments, the eye-ward facing and world facing surfaces of the see-through eyepiece can be extended to form full eyeglass lenses in a binocular frame. FIG. 4 illustrates a binocular head wearable display 400 including two see-through eyepieces 401 integrated into a frame and which eyepieces extend across a substantial portion of the user's field of view. The see-through add-on component (e.g., see-through add-on component 110 in FIG. 1) of each eyepiece 401 may be designed to extend across the entire eyepiece so that no seam is formed in the middle portion of the eyepiece. Display light 145 may be launched into eyepieces 401 at the peripheral temple regions and guided towards out couplers 125 via TIR, as described above. These full eyeglass lenses may be implemented with or without prescription curvatures of the outside surfaces.

Figure 5:
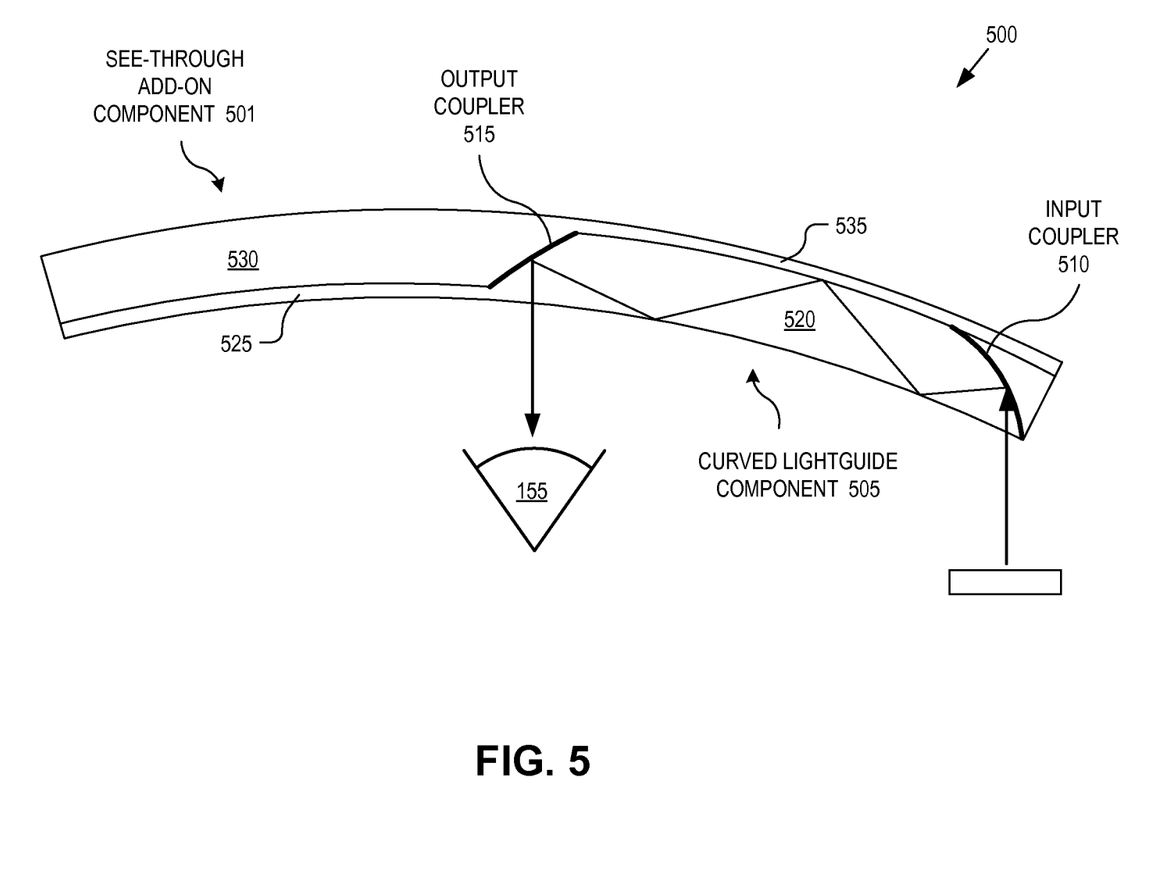
FIG. 5 illustrates an example see-through add-on component for attaching to the curved lightguide component of the eyepiece, in accordance with an embodiment of the disclosure.

FIG. 5 illustrates an example see-through add-on component 501 that extends across the entire eyepiece 500 to avoid surface seams in the central region of the eyepiece, in accordance with an embodiment of the disclosure. The illustrated embodiment of eyepiece 500 includes a curved lightguide component 505, see-through add-on component 501, input coupler 510, and output coupler 515. The illustrated embodiment of curved lightguide component 505 includes a thick portion 520 and a thin portion 525. The illustrated embodiment of see-through add-on component 501 includes a thick portion 530 and a thin portion 535.

Eyepiece 500 is similar to eyepiece 100 and operates in a similar manner, except that the thin portion 535 of see-through add-on component 501 conformably mates to and extends across the world side of thick portion 520 of curved lightguide component 505. Similarly, the thin portion 525 of curved lightguide component 505 conformably mates to and extends across the eye-ward side of thick portion 530 of see-through add-on component 501. Output coupler 515 is disposed at the transitions between the thin and thick portions. The thin portions 525 and 535 provide continuous outside surfaces without seams, thereby improving the industrial design.

In one embodiment, see-through add-on component 501 is bonded to curved lightguide component 505 using a low refractive index glue (lower than the refractive index of curved lightguide component 505 and see-through add-on component 501) to preserve TIR at the interface boundary. Thin portions 525 and 535 may be fabricated by grinding or sanding the surfaces of see-through add-on component 501 and curved lightguide component 505 to achieve the desired thickness after bonding the two components together.

The illustrated embodiment of head wearable displays 300 or 400 are capable of displaying an augmented reality to the user. Eyepieces 301, 401, or 500 permit the user to see a real world image via ambient light 185. Left and right display images (binocular embodiment illustrated in FIG. 4) may be generated by display sources 150 mounted in peripheral corners outside the user's central vision. Display light 145 is seen by the user as a virtual image superimposed over ambient light 185 as an augmented reality. As mentioned above, in some embodiments, the outer surfaces of these eyepieces may not have complementary curvatures to impart prescriptive correction on ambient light 185.

FIGS. 6A-6D illustrate various alternative examples of input couplers and output couplers that can be used in connection with the eyepiece designs (e.g., eyepieces 100, 301, 401, or 500) described above, in accordance with embodiments of the disclosure.

Figure 6A:
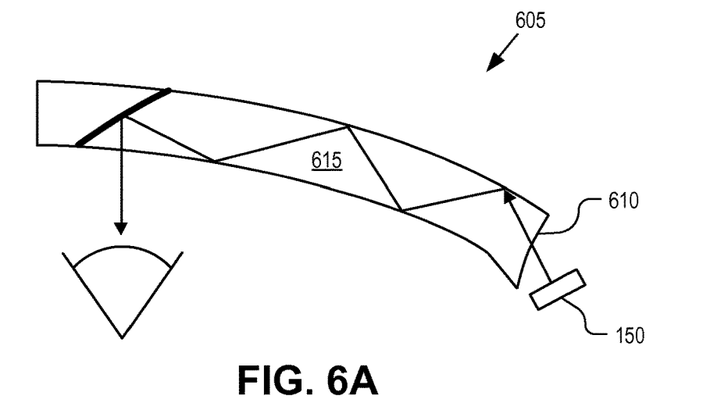
FIGS. 6A-6D illustrate various examples of input couplers and output couplers, in accordance with embodiments of the disclosure.

For example, FIG. 6A illustrates an eyepiece 605 where an input coupler 610 is formed as an input surface molded into an end of curved waveguide component 615. In other words, the display light 145 is not input through the eye-ward facing surface, but rather, through an end surface proximate to display source 150.

Figure 6B:
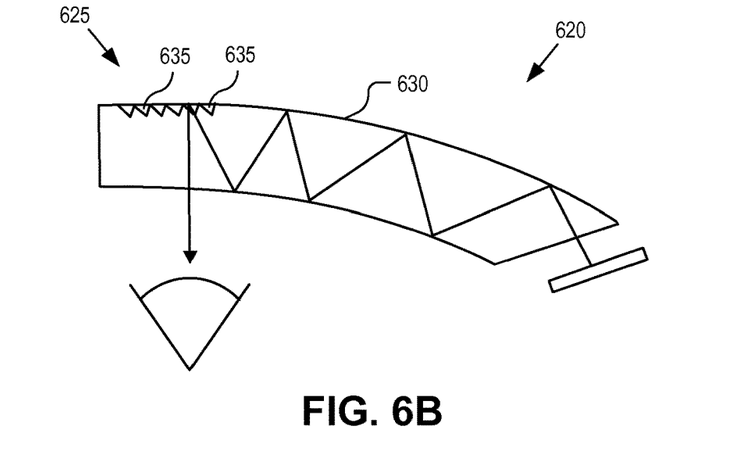

FIG. 6B illustrates an eyepiece 620 where the output coupler is formed as an array of prism structures 625 disposed along the world facing surface 630 in the viewing region. Prism structures 625 may be implemented as an array of small obliquely angled partially reflective surfaces. In the illustrated embodiment of FIG. 6B, a plurality of see-through add-on components 635 are bonded to curved waveguide component 640 behind each reflective surface. Although not illustrated, in some embodiments, eyepiece 620 may further include an array of prism structures as an input coupler in the input region. Using prism structures at the input region can compensate for lateral chromatic aberrations induced by the output prism structures 625.

Figure 6C:
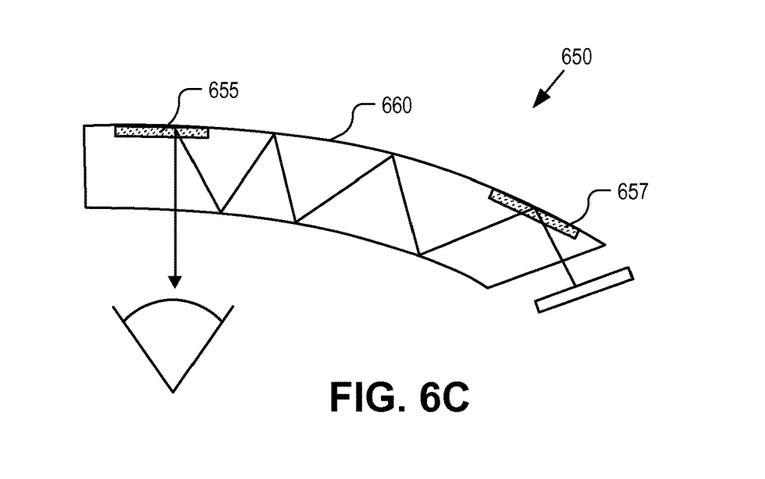

FIG. 6C illustrates an eyepiece 650 where the output coupler is formed as a hologram 655 disposed along the world facing surface 660 in the viewing region. In this embodiment, a see-through add-on component may be omitted. Furthermore, FIG. 6C illustrates the inclusion of a reflective hologram 657 as an input coupler to provide color correction for chromatic aberrations induced by the output hologram 655.

Figure 6D:
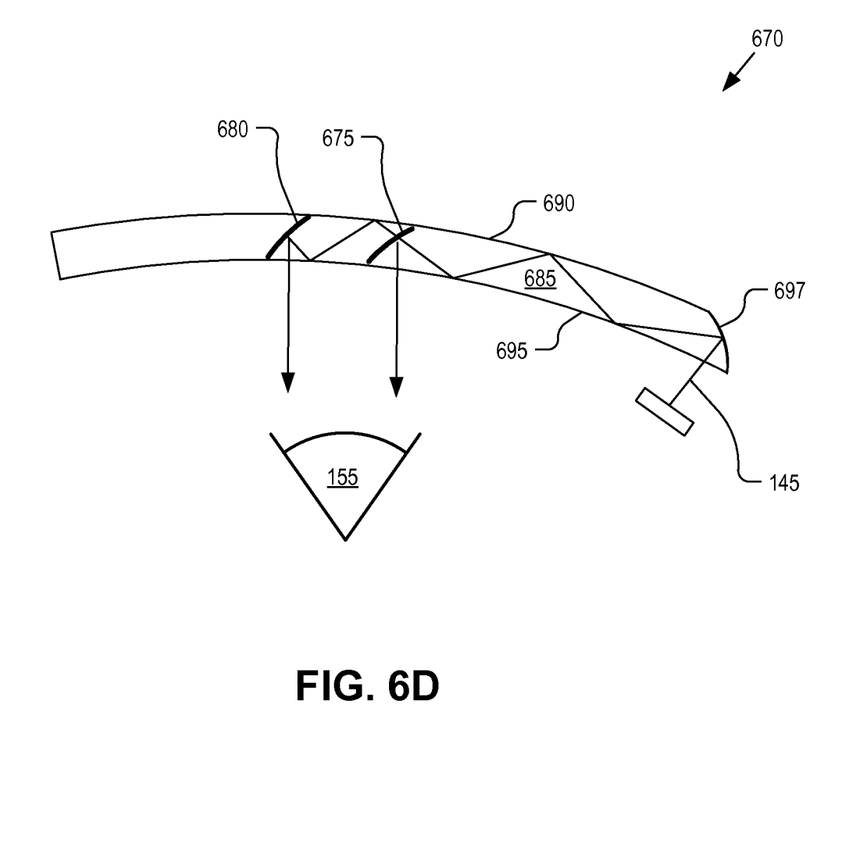

FIG. 6D illustrates an eyepiece 670 where the output coupler is formed as a pair of partially reflective mirror segments 675 and 680 disposed within curved waveguide component 685. Partially reflective mirror segments 675 and 680 operate to further expand the eyebox from which display light 145 can be viewed from eyepiece 670. In other words, mirror segments 675 and 680 reflect display light output from a single pixel in a manner that stitches the images reflected by each mirror segment 675 and 680 together at the viewing region to extend the eyebox from which the single pixel can be viewed. Partially reflective mirror segment 680 is disposed behind partially reflective mirror segment 675 such that display light 145 must first pass through partially reflective mirror segment 675 before reaching partially reflective mirror segment 680. In the illustrated embodiment, partially reflective mirror segments 675 and 680 are both curved freeform surfaces while world facing surface 690 and eye-ward facing surface 695 are spherical surfaces. In one embodiment, world facing surface 690 is a sphere with a radius of 90 mm and eye-ward facing surface 695 is a sphere with a radius of 92.5 mm. In one embodiment, partially reflective mirror segment 675 has a freeform shape defined by equations 1 and 2 with coefficient values of $x^2=0.0035$, $y^2=0.00453$, with a relative tilt of 23.25 degrees; partially reflective mirror segment 680 has a freeform shape defined by equations 1 and 2 with coefficient values of $x^2=0.00457$, $y^2=0.00525$, with a relative tilt of 26 degrees; and input coupler 697 has a freeform shape defined by equations 1 and 2 with coefficient values of $x^2=-0.0053$, $y^2=-0.00273$, $x^3=7.142E-005$, $x^2y=-6.076E-006$, $xy^2=5.2072E-005$, $(x,y,z)=(-28.5, 0, -3)$ with a relative tilt of 48.8 degrees. Of course, other coefficient values and dimensions may be implemented.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, the eyepiece comprising:
    a curved lightguide component for guiding display light received at an input region peripherally located from a viewing region and emitting the display light along an eye-ward direction in the viewing region, the curved lightguide component including:
        an eye-ward facing surface that is concave; and
        a world facing surface that is convex and opposite the eye-ward facing surface;
    an input coupler disposed at the input region to couple the display light into the curved lightguide component;
    an output coupler disposed at the viewing region to redirect the display light towards the eye-ward direction for output from the curved lightguide component, wherein the output coupler is partially transmissive to ambient light incident through the world facing surface such that the viewing region is see-through, and wherein the output coupler comprises a beam splitter having a first curved freeform surface, wherein the beam splitter is at least partially transmissive to visible light, wherein the display light is guided between the input coupler and the output coupler substantially by total internal reflection;
    wherein the input coupler and the output coupler are configured to redirect light rays of the display light received from a single pixel of a display source along one of two different paths through the curved lightguide component such that a first group of the light rays encounters a different number of total internal reflections than a second group of the light rays; and
    wherein the first group of the light rays and the second group of the light rays stitch together at the viewing region to extend an eyebox from which the single pixel can be viewed.

2. The eyepiece of claim 1, wherein in the input coupler comprises a mirror having a second curved freeform surface and wherein the display light enters into the curved lightguide component through the eye-ward facing surface.

3. The eyepiece of claim 1, further comprising a see-through curved component disposed across the viewing region with the output coupler disposed along an interface between the see-through curved component and the curved lightguide component, wherein the see-through curved component and the curved lightguide component have a substantially same refractive index.

4. The eyepiece of claim 3, wherein the see-through curved component has a thin portion and a thick portion and the curved lightguide component has a thin portion and a thick portion, wherein the thin portion of the see-through curved component conformably mates to the thick portion of the curved lightguide component and wherein the thin portion of the curved lightguide component conformably mates to the thick portion of the see-through curved component, wherein the output coupler is disposed at a transition from the thick portions to the thin portions of the see-through curved component and the curved lightguide component.

5. The eyepiece of claim 1, wherein the display light is coupled through an input surface and an end surface of the curved lightguide component that is not the eye-ward facing surface.

6. The eyepiece of claim 1, wherein the output coupler comprises an array of prism structures disposed along the world facing surface.

7. The eyepiece of claim 1, wherein the output coupler comprises a hologram disposed along the world facing surface.

8. The eyepiece of claim 1, wherein the output coupler comprises a first partially reflective mirror segment and a second partially reflective mirror segment disposed within the curved lightguide component to expand an eyebox of the display light, wherein the second partially reflective mirror segment is disposed behind the first partially reflective mirror segment such that the display light must pass through the first partially reflective mirror segment before reaching the second partially reflective mirror segment.

9. The eyepiece of claim 8, wherein the first partially reflective mirror segment and the second partially reflective mirror segment are curved freeform surfaces.

10. The eyepiece of claim 1, wherein the eye-ward facing surface and the world facing surface of the curved lightguide component are both spherical surfaces.

11. A head wearable display, comprising:
a display source to generate display light at a peripheral location;
a curved lightguide component for guiding the display light to a viewing region offset from the peripheral location and emitting the display light along an eye-ward direction in the viewing region, the curved lightguide component including: an eye-ward facing surface that is concave; and
a world facing surface that is convex and opposite the eye-ward facing surface;
an input coupler disposed at an input region to couple the display light into the curved lightguide component;
an output coupler disposed at the viewing region to redirect the display light towards the eye-ward direction for output from the curved lightguide component, wherein the output coupler is partially transmissive to ambient light incident through the world facing surface such that the viewing region is see-through, and wherein the display light is guided between the input coupler and the output coupler substantially by total internal reflection, and wherein the output coupler comprises a beam splitter having a first curved freeform surface, wherein the beam splitter is at least partially transmissive to visible light;
a frame assembly to support the curved lightguide component and the display source for wearing on a head of a user with the viewing region positioned in front of an eye of the user;
wherein the input coupler and the output coupler are configured to redirect light rays of the display light received from a single pixel of a display source along one of two different paths through the curved lightguide component such that a first group of the light rays encounters a different number of total internal reflections than a second group of the light rays; and
wherein the first group of the light rays and the second group of the light rays stitch together at the viewing region to extend an eyebox from which the single pixel can be viewed.

12. The head wearable display of claim 11, wherein in the input coupler comprises a mirror having a second curved freeform surface and wherein the display light enters into the curved lightguide component through the eye-ward facing surface.

13. The head wearable display of claim 11, further comprising a see-through curved component disposed across the viewing region with the output coupler disposed along an interface between the see-through curved component and the curved lightguide component, wherein the see-through curved component and the curved lightguide component have a substantially same refractive index.

14. The head wearable display of claim 11, wherein the display light is coupled through an input surface and an end surface of the curved lightguide component that is not the eye-ward facing surface.

15. The head wearable display of claim 11, wherein the output coupler further comprises a hologram disposed along the world facing surface.

16. The head wearable display of claim 11, wherein the output coupler comprises a first partially reflective mirror segment and a second partially reflective mirror segment disposed within the curved lightguide component to expand an eyebox of the display light, wherein the second partially reflective mirror segment is disposed behind the first partially reflective mirror segment such that the display light must pass through the first partially reflective mirror segment before reaching the second partially reflective mirror segment.

17. The head wearable display of claim 16, wherein the first partially reflective mirror segment and the second partially reflective mirror segment are curved freeform surfaces.

18. The head wearable display of claim 11, further comprising:
an infrared camera to monitor eye movements using infrared light; and
an optical combiner disposed adjacent to the input region, the optical combiner to combine the display light and the infrared light for propagation along a common path through the curved lightguide component.

* * * * *